US008315896B2

(12) United States Patent
Tennefoss

(10) Patent No.: US 8,315,896 B2
(45) Date of Patent: Nov. 20, 2012

(54) NETWORK DEVICE AND METHOD FOR CALCULATING ENERGY SAVINGS BASED ON REMOTE WORK LOCATION

(75) Inventor: Michael R. Tennefoss, Portola Valley, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 171 days.

(21) Appl. No.: 12/847,943

(22) Filed: Jul. 30, 2010

(65) Prior Publication Data

US 2012/0029976 A1 Feb. 2, 2012

(51) Int. Cl.
*G06Q 10/00* (2012.01)
(52) U.S. Cl. ...................................... 705/7.11
(58) Field of Classification Search .............. 705/7.11
See application file for complete search history.

(56) References Cited

U.S. PATENT DOCUMENTS

| | | | | | |
|---|---|---|---|---|---|
| 5,255,183 | A | * | 10/1993 | Katz | 705/30 |
| 5,557,748 | A | * | 9/1996 | Norris | 709/220 |
| 5,696,702 | A | * | 12/1997 | Skinner et al. | 702/186 |
| 5,757,916 | A | * | 5/1998 | MacDoran et al. | 380/258 |
| 5,842,181 | A | * | 11/1998 | Fanjoy | 705/32 |
| 5,963,914 | A | * | 10/1999 | Skinner et al. | 705/7.15 |
| 6,185,514 | B1 | * | 2/2001 | Skinner et al. | 702/188 |
| 6,325,631 | B1 | * | 12/2001 | Kouba et al. | 434/219 |
| 6,446,004 | B1 | * | 9/2002 | Cao et al. | 701/482 |
| 7,062,032 | B1 | * | 6/2006 | Bloom et al. | 379/265.04 |
| 7,177,426 | B1 | * | 2/2007 | Dube | 380/46 |
| 7,188,027 | B2 | * | 3/2007 | Smith et al. | 701/484 |
| 7,236,970 | B1 | * | 6/2007 | Winslow | 1/1 |
| 7,366,579 | B2 | * | 4/2008 | Ara et al. | 700/111 |
| 7,536,256 | B2 | * | 5/2009 | Kelley et al. | 701/425 |
| 7,610,146 | B2 | * | 10/2009 | Breed | 701/514 |
| 7,617,542 | B2 | * | 11/2009 | Vataja | 726/30 |
| 7,983,929 | B2 | * | 7/2011 | Zimmerman | 705/1.1 |
| 8,024,073 | B2 | * | 9/2011 | Imes et al. | 700/276 |
| 8,068,870 | B2 | * | 11/2011 | Kumar et al. | 455/552.1 |
| 8,068,977 | B2 | * | 11/2011 | Ozawa et al. | 701/465 |
| 8,174,381 | B2 | * | 5/2012 | Imes et al. | 340/539.23 |

(Continued)

OTHER PUBLICATIONS

Graychase, Naomi, Save the Planet, Work Remotely Enterprise Networking Planet, Mar. 18, 2008.*

(Continued)

*Primary Examiner* — Scott L Jarrett
(74) *Attorney, Agent, or Firm* — Blakely, Sokoloff, Taylor & Zafman LLP

(57) ABSTRACT

Calculating and validating energy savings. Energy savings from programs such as telework are calculated and validated through the use of authenticated remote access systems. A person or device working away from the place of work authenticates themselves with a remote access system using a personal digital device. Through such authenticated remote access logs including location information, systems can determine where a person and/or device is, and is not. Energy savings can be calculated based not only on the energy expenditures of avoided travel, but also on the energy expenditures saved at the place of work location. These energy savings may be summed over employees and/or devices and/or places of work. Energy savings are documented, and may be expressed in terms of KWH, BTUs, metric tons of CO2, or other similarly derivable units. These may be used for example for credit trading. Such monitoring, calculating, and trading may be locally provided, offered as a managed service, or provided as a Software as a Service application for individuals, devices, groups of individuals, groups of devices, or enterprises.

19 Claims, 1 Drawing Sheet

U.S. PATENT DOCUMENTS

| | | | |
|---|---|---|---|
| 2003/0070100 A1* | 4/2003 | Winkler | 713/202 |
| 2003/0135599 A1* | 7/2003 | Sanger | 709/223 |
| 2004/0093264 A1* | 5/2004 | Shimizu | 705/13 |
| 2004/0172403 A1* | 9/2004 | Steele et al. | 707/100 |
| 2004/0189701 A1* | 9/2004 | Badt, Jr. | 345/753 |
| 2006/0206370 A1* | 9/2006 | Skopal | 705/9 |
| 2007/0101438 A1* | 5/2007 | Govindarajan | 726/27 |
| 2009/0094164 A1* | 4/2009 | Fontaine et al. | 705/67 |
| 2009/0100260 A1* | 4/2009 | Govindarajan | 713/155 |
| 2009/0158404 A1* | 6/2009 | Hahn et al. | 726/5 |
| 2009/0210295 A1* | 8/2009 | Edholm et al. | 705/11 |
| 2010/0186072 A1* | 7/2010 | Kumar | 726/7 |
| 2010/0198639 A1* | 8/2010 | Ara et al. | 705/7 |
| 2011/0112943 A1* | 5/2011 | Dietz et al. | 705/32 |
| 2011/0252464 A1* | 10/2011 | Sanjeev | 726/7 |

OTHER PUBLICATIONS

Samson, Ted, Calculate your savings from telecommuting InfoWorld, Mar. 10, 2009.*

Burr, William E. et al., Electronic Authenticatino Guide National Institute of Standards and Technology, Apr. 2006.*

Scarfone, Karen et al., Guide to Enterprise Telework and Remote Access Security National Institute of Standards and Technology, Jun. 2009.*

Oracle Adaptive Access Manager Oracle, E12049-03, May 2009.*

Avery, Patrick, Telecommuting Tool Calculate Savings, Productivity Gains IT BusinessEdge, Mar. 16, 2009.*

Green, Harry A. et al., Telecommuting Saving Energy and Promoting Progress Tennessee Advisory Commision on Intergovernmenal Relations, TACIR, Staff Research Brief, No. 19, Sep. 2008.*

Telecommuting calculating adds up savings for employees and employers AccountingWeb, Mar. 17, 2009.*

Kitou, Erasmia et al., Web-based tool for estimating environmental impacts of telework Proceedings of the 2001 IEE International Symposium on Electronics and the Environment, May 2001.*

Telecommuting Calculators AvoidingGoingToWork.com, Nov. 20, 2009.*

Lister, Kate, Workshifting Benefits: The Bottom Line TeleworkResearchNetwork.com, May 2010.*

* cited by examiner

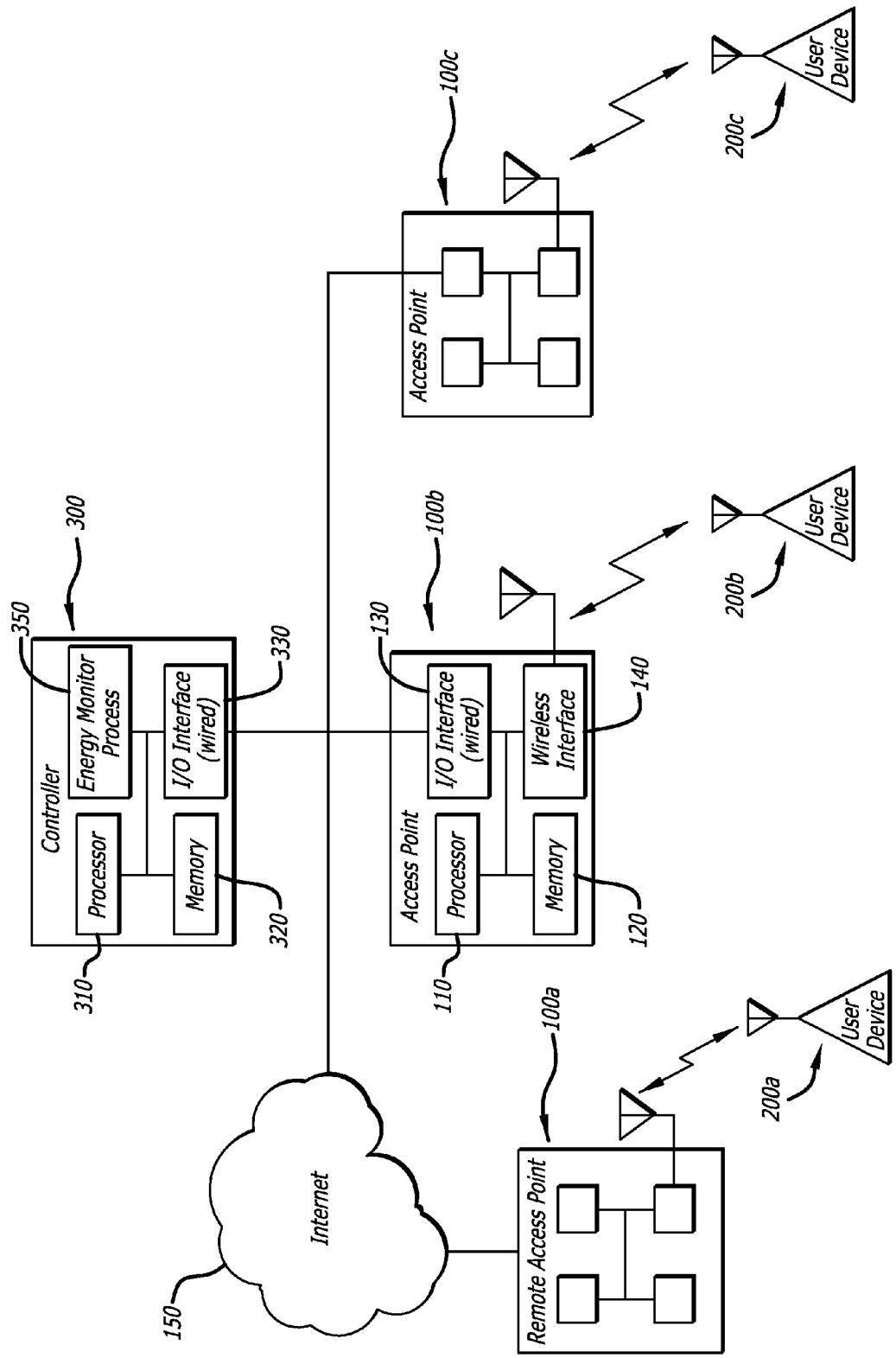

NETWORK DEVICE AND METHOD FOR CALCULATING ENERGY SAVINGS BASED ON REMOTE WORK LOCATION

BACKGROUND OF THE INVENTION

The present invention relates to monitoring and validating energy savings such as carbon offsets.

Saving energy is becoming more important to enterprises large and small. As an example, automated building control systems save energy by monitoring building occupancy in real-time, combining these data with inferred data derived from weather forecast or past occupancy trends, and factoring in other environmental information such as interior and exterior temperature and humidity, sun and solar data, and building models to adjust internal temperature, humidity, and light levels.

Another form of energy saving involves telecommuting and telework programs. Employees working from home or from satellite offices are not traveling to and occupying an office. Particularly, an employee working from home is avoiding travel-based energy expenditures from the system. An employee working from home is also reducing the energy required at his or her place of work to maintain environmental conditions at the office, support parking areas, and/or run ancillary services (such as janitorial, security, and food services).

Another developing aspect of these energy savings is emissions trading—known as "cap and trade"—an administrative approach to controlling pollution by providing economic incentives for reducing the emission of pollutants. A government authority sets a "cap" (limit) on the amount of a pollutant that can be emitted. Companies are issued emission permits to pollute and are required to hold an equivalent number of pollution "credits." The total credits cannot exceed the cap. If a company needs to pollute more than the cap allows then it must buy credits from those who pollute less in a transfer known as a "trade." Active trading programs exist for several pollutants. The largest trading market for greenhouse gases is the European Union Emission Trading Scheme. In the United States there is a national market to reduce acid rain, as well as regional markets for nitrogen oxides.

One of the issues with the present system is that credits are often purchased from countries in the developing world where promised emission reductions may actually never come to pass. A farmer in Brazil might promise to reduce methane gas emissions from a farm, submit the credit application to the United Nations for approval, and then sell the credits without any assurance that the promise will be fulfilled.

Enterprises engage in many activities that reduce carbon emissions and have the potential to generate trading credits. Previously mentioned telework programs under which employees work from home can significantly reduce greenhouse gas emissions by removing commuter and mass transit vehicles going to and from work (the longer the distance travelled), lowering heating/ventilation/air conditioning/refrigeration/lighting/electricity (HVACRLC) expenses at the place of business, and lowering ancillary service costs (such as janitorial, security, and food services) at the place of work.

Another example pertains to the energy savings achieved by automated building control systems. Building energy consumption can be reduced in real-time by the use of automated systems that monitor building occupancy, enthalpy, sun position, temperature, and other factors and then act on them by adjusting temperature, humidity, and light levels to achieve energy savings.

These are but a few of many examples. In these cases, the primary objective of the programs is to reduce on-going operating expenses by lowering energy consumption. The associated reduction in greenhouse gases and other pollutants goes unmonitored and therefore unexploited by the cap and trade system.

What is needed is a way of monitoring and validating these energy savings, and a means of generating credits that is verifiable and which doesn't of necessity rely on purchasing credits from outside the region in which the purchaser conducts business.

BRIEF DESCRIPTION OF THE DRAWINGS

The invention may be best understood by referring to the following description and accompanying drawings that are used to illustrate embodiments of the invention in which:

FIG. 1 shows clients in a wireless network.

DETAILED DESCRIPTION

Embodiments of the invention relate to methods of detecting and measuring energy savings. According to the invention, authenticated remote access to information networks, such as wired and/or wireless digital networks, is used to validate the location from which a person is working. When an individual works away from the office their location is determined by entry into the remote access system, which may be an authenticated system to prevent spoofing. Location information is made available to a monitoring process attached to the network, which calculates or derives energy savings and credits from this location information.

FIG. 1 shows a network in which access points (APs) 100 and controllers 300 are purpose-made digital devices, each containing a processor 110, 310, memory hierarchy 120 320, and input-output interfaces 130, 330, 140. In one embodiment of the invention, a MIPS-class processor 110 310 such as those from Cavium or RMI is used. Other suitable processors, such as those from Intel or AMD may also be used. The memory hierarchy 120 320 traditionally comprises fast read/write memory for holding processor data and instructions while operating, and nonvolatile memory such as EEPROM and/or Flash for storing files and system startup information. Wired interfaces 130 330 are typically IEEE 802.3 Ethernet interfaces, used for wired connections to other network devices such as switches, or to a controller, but may include traditional interfaces such as wired telephone lines or control networks comprised of sensors and actuators such as BACnet or LonWorks. Wireless interfaces 140 may be wireless telephone, WiMAX, 3G, 4G, control networks such as 802.15.4 Zig Bee, and/or IEEE 802.11, and are typically present on access points and remote access points, but not on controllers. In one embodiment of the invention, controllers 300 and APs 100 operate under control of a LINUX operating system, with purpose-built programs providing host controller and access point functionality. Controllers 300 typically provide more computational capabilities, such as faster processors and more memory. Controllers 300 may also host processes such as databases, accounting, and the like.

Client devices 200 have similar architectures, chiefly differing in input/output devices; a laptop computer will usually contain a large LCD; a sensor may include a current or voltage detector; and a control output may include a load control. Client devices may range from small handheld wireless devices such as cell phones, dual mode (Wi-Fi and Cellular) phones, and other handheld devices with wireless capabilities, computing devices from tablets and netbooks to laptops and desktop computers, as well as devices such as control sensors and actuators, handheld data collection and/or entry devices, barcode scanners, and the like.

The invention uses authenticated remote access to a digital network to validate the location from which a person is working or device is functioning. When an individual wishes to work away from their primary work location such as an office, their location is determined by entry into the remote access system, optionally in an authenticated manner to prevent spoofing. In operation, the individual activates a digital device such as a laptop or handheld device, which authenticates through the remote access system of the digital network.

According to the invention, as part of the authentication process, the current location of the user being authenticated is obtained. This authentication event information, including at least user identification, time and date, and the location, are made available to an energy monitor process 350 attached to the network. As an example, this information may be stored in a database which is accessible by the energy monitor process through the network, or this information may be sent through the network to the energy monitor process.

An energy monitor attached to, or energy calculation application associated with, the network processes this location information, including default location information for the user, to determine energy savings. These energy savings may be summed across all users for the system, and combined with information from similar systems enterprise-wide.

In one embodiment, a user or device 200a authenticates through a remote access point 100a. Communication is established between the digital device 100a, such as a laptop, and the remote access point 100a. This communication may be wired or wireless. The remote access point 100a is connected to the switched Internet 150, possibly through a router, modem, or the like. The remote access point 100a communicates with a controller 300 such as an enterprise controller to authenticate the digital device, and the individual. This authentication may involve presentation and verification of device MAC addresses, device serial numbers, digital certificates, credentials, storage devices, access cards, smart cards, biometric data, passwords, challenge—response, or any combination thereof. As examples, a laptop computer may authenticate through the use of digital certificates, while with a wireless handheld device, authentication by the device's MAC address may be deemed sufficient.

In such an embodiment the user's location is established by the location of the remote access point, laptop, or control device. This location, in turn, may be established in a number of ways. One way is to record the location of the remote access point on installation. This may be established for example by having the user of the remote access point enter the location such as a street address the first time the remote access point is connected to the system. This location may also be audited.

Location may also be established and/or verified through the use of location-aware devices. Many cellphones, tablets, and other handheld devices are location aware, whether through the use of GPS or similar technologies, or through the use of triangulation services such as those used for E911 services. When a location-aware device authenticates with the network through an access point, location information provided by the device may be used not only to establish the user's location, but also to validate the location of the access point. When a location-aware device authenticates through the public network, such as through a Wi-Fi hotspot, or through a guest connection provided by a client, the location information may be cached along with other information about the entry device to the network, such as MAC address, BSSID, time, data, and the like.

The energy monitor calculates the "out-of-office" savings by calculating the distance from the device or user's location (identified by IP address and/or physical location or address of the remote access device with which the individual is authenticated) and the device or individual's default or primary place of work. The total calculated distance is multiplied by either a typical distance-related value representing the hydrocarbon consumption of an average commuter or the actual mileage of the individual's personal or commuter vehicle in order to derive the total commuter-related hydrocarbon savings. This value may be derived for all users working away from their primary offices, and then summed to arrive at the total out-of-office savings. The calculated distance may be generated using simple geodesic calculations, or by using mapping services such as Google Maps to calculate road mileage and optionally transit times to further model commute savings.

The "office" energy savings are calculated for all users that are determined to be working away from the office. These savings for example may be based on the square foot/meter of unoccupied space and include factors such as (1) energy savings estimated from an average HVACR value per occupied area, (2) in the case of individual offices with switched lights by the energy savings achieved by ballasts required to illuminate the define space, (3) by a services value that is calculated based on the total energy consumption of the offered services or devices divided by the total number of employees in the facility.

Optionally, the occupancy state of a user's primary office can be inferred and validated by monitoring and recording that no wired ports are actively being used within the defined office space, and/or no access controlled entry has been granted to a person or associated vehicle, and/or by using presence or Wi-Fi triangulation to ensure that no wireless devices associated with the user are used in the space and/or by ensuring that no data or telecommunication transmission are made and/or manually answered by any apparatus within the or elsewhere within the place of work.

The commuter and office savings are summed to arrive at the total savings per user. These savings may be summed over all devices and users at a particular location, and/or over all locations in an enterprise. Detailed reports may be provided on a per user, per location, per enterprise basis, or on the basis of other affinity groups such as business divisions. The individual and/or summed data are stored in a data base, together with the associated authentication, location, triangulation, and other means and metrics required to validate the authenticity and correctness of the results. This database may be associated with the energy monitor process, or may be hosted with a database server attached to the network. The energy monitor itself may be in the nature of a process running in an existing host attached to the network, or it may be hosted in a separate computing platform attached to the network. The actual savings calculated by the energy monitor may be in the form of kWh, BTU, metric tons of $CO_2$, and/or any other unit of measurement that can be derived and is required or desired for credit trading.

A copy or electronic facsimile of reports generated by the energy monitor will serve as evidence of the savings achieved on whatever unit of time measurement is required for credit trading on one or more markets or through private exchange(s).

It is anticipated that the processes described in the invention, and the credit monitoring and trading can be performed by the user, contractor, or service provider such as AT&T, Honeywell, IBM, or Orange. Monitoring and trading could be locally provided, offered as a managed service, and/or provided as a software-as-a-service (SaaS) application. Such services may be operated by or on behalf of enterprises, as well as for devices, individuals, groups of devices, or groups of individuals. Groups of individuals may include, for example, affinity groups such as Lions or Kiwanis who wish to pool energy savings and associated credits.

While energy monitor 350 is shown as being hosted in controller 300, it may be hosted on any suitable device attached to the network, but is dependent on its operation on information provided by access points 100 on the network, and wireless devices 200.

It is also anticipated that some form of credit sharing could occur under which the owner/user of the facility generating credits and the person/company/service monitoring and/or trading the credits could jointly split and/or trade the credits.

This invention does not anticipate one specific trading market. It does anticipate that credits could be measured and/or traded in monetary units and/or in units of greenhouse gases, units of energy, units of hydrocarbons, units of nitrous oxide, or any other unit of measurements required or useful for trading.

Aspects of the present invention may be realized in hardware, software, or a combination of hardware and software. The energy monitor of the present invention may be realized in a centralized fashion in one computer system such as a process on a network controller or database server, or in a distributed fashion where different elements are spread across several interconnected computer systems and/or services associated with the network. Any kind of computer system or other apparatus connected to the network and adapted for carrying out the methods described herein is suited. A typical combination of hardware and software may be a general purpose computer system connected to the network with a computer program that, when being loaded and executed, controls the computer system such that it carries out the methods described herein.

The present invention also may be embedded in a computer program product in non-transitory form, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

I claim:

1. A method of validating hydrocarbon consumption through a digital network having a plurality of remote access points, the method comprising:
    validating, by a network device, a remote location of a remote access point using location information provided by a location-aware device of a user that is authenticated by the remote access point, wherein validating the remote location includes determining an occupancy state of the user at the remote location and a primary location, based on one or more of (i) whether a wireless connection or a wired port is actively used by the user at the primary location, (ii) whether an access controlled entry is granted to the user or a vehicle associated with the user at the primary location, and (iii) using presence information or wireless triangulation to ensure that the user is at the primary location;
    calculating, by the network device, a distance from the validated remote location to a primary location associated with the user;
    deriving, by the network device, hydrocarbon consumption savings from the user working at the remote location rather than the primary location based on the distance, the derived hydrocarbon consumption savings are based on at least one of (i) avoiding travel between the remote location and the primary location, and (ii) office energy savings from having the user working away from the primary location associated with the user; and
    generating a report, by the network device, that includes at least the derived hydrocarbon consumption savings and utilizing the report for pollution credit sharing between an owner or user of the primary location or an owner or user of the remote location, wherein the pollution credit sharing includes trading or splitting credits with the owner or user of the primary location.

2. The method of claim 1, wherein the derived hydrocarbon consumption savings are summed across one or more of:
    a plurality of devices at the primary location,
    a plurality of users at the primary location,
    a plurality of locations in an enterprise, and
    a specific group of users in the enterprise.

3. The method of claim 1, further comprising:
    obtaining, by the network device, authentication event information that comprises the user identification, a time, a date, and a location; and
    validating, by the network device, the remote location of the remote access point using the location data contained within the authentication event information.

4. The method of claim 3, further comprising:
    auditing, by the network device, a pre-configured location of the remote access point using the validated remote location.

5. The method of claim 4, wherein calculating the distance further comprises:
    multiplying, by the network device, by a factor representing one or more of an amount of hydrocarbon consumption of an average commuter, and an actual mileage of a commuter vehicle.

6. The method of claim 1, wherein the derived hydrocarbon consumption savings are calculated based on one or more of the following factors:
    an area of the unoccupied space;
    an average Heating, Ventilation, Air Conditioning & Refrigeration (HVACR) value per occupied area;
    a number of ballasts required to illuminate a defined individual office space for the user;
    a number of network ports on switches and routers, and the power consumed thereby, required to connect telephones, computers, displays, printers, and other devices and appliances in the individual office space for the user; and
    a service value based on a total energy consumption of offered services or devices divided by a total number of users at the primary location.

7. The method of claim 1, wherein reporting the hydrocarbon consumption savings further comprises:
    providing, by the network device, a report on a per user basis, a per location basis, a per enterprise basis, a per business group basis, or a combination thereof.

8. The method of claim 1, wherein the hydrocarbon consumption savings are calculated in a form selected from one or more of kWh, BTU, metric tons of CO2 that is used for pollution credit trading.

9. A network device for validating hydrocarbon consumption through a digital network having a plurality of remote access points, the network device comprising:
- a processor;
- a memory;
- a validating mechanism to verify a remote location of a remote access point using location information provided by a device in use by, carried on a user or in proximity of, or otherwise associated with the user that is authenticated by or through the remote access point, wherein verifying of the remote location includes determining an occupancy state of the user at the remote location and a primary location, based on one or more of (i) whether a wireless connection or a wired port is actively used by the user at the primary location, (ii) whether an access controlled entry is granted to the user or a vehicle associated with the user at the primary location, and (iii) using presence information or wireless triangulation to ensure that the user is at the primary location;
- a calculating mechanism operating with the processor, the calculating mechanism to calculate a distance from the verified remote location to a primary location associated with the user;
- a deriving mechanism operating with the processor, the deriving mechanism to derive hydrocarbon consumption savings from the user working at the remote location rather than the primary location based on the distance, the derived hydrocarbon consumption savings are based on at least one of (i) avoiding travel between the remote location and the primary location, and (ii) office energy savings from having the user working away from the primary location associated with the user; and
- a reporting mechanism operating with the processor, the reporting mechanism generate a report that includes at least the derived hydrocarbon consumption savings and utilizing the report for pollution credit sharing between an owner or user of the primary location or an owner or user of the remote location, wherein the pollution credit sharing includes trading or splitting credits with the owner or user of the primary location.

10. The network device of claim 9, wherein the derived hydrocarbon consumption savings includes hydrocarbon consumption savings from one or more of: avoided travel between the remote location and the primary location, and office energy savings from having the user working away from the primary location associated with the user.

11. The network device of claim 9, wherein the validating mechanism further to:
- obtain authentication event information that comprises one or more of a user identification, a time, a date, and a location; and
- validate the remote location of the remote access point using the location in the authentication event information.

12. The network device of claim 11, further comprising:
- an auditing mechanism operating with the processor, the auditing mechanism to audit a pre-configured location of the remote access point using the validated remote location.

13. The network device of claim 9, wherein the calculating mechanism further to:
multiply the distance by a factor representing one or more of an amount of hydrocarbon consumption of an average commuter, and an actual mileage of a commuter vehicle.

14. The network device of claim 9, wherein the derived hydrocarbon consumption savings are calculated based on one or more of the following factors:
- an area of the unoccupied space;
- an average Heating, Ventilation, Air Conditioning & Refrigeration (HVACR) value per occupied area;
- a number of ballasts required to illuminate a defined individual office space for the user;
- a number of network ports on switches and routers, and the power consumed thereby, required to connect telephones, computers, displays, printers, and other devices and appliances in the individual office space for the user; and
- a service value based on a total energy consumption of offered services or devices divided by a total number of users at the primary location.

15. The network device of claim 1, further comprising:
- an inferring mechanism operating with the processor, the inferring mechanism to infer an occupancy state of the user at the primary location based on one or more of:
  - whether a wired port is actively used in a defined office space at the primary location,
  - whether an access controlled entry is granted to the user or a vehicle associated with the user at the primary location,
  - using presence information or wireless triangulation to ensure that the user is not at the location and that no data transmission is made at the primary location by the user.

16. The network device of claim 9, wherein the reporting mechanism further to provide a report on a per user basis, a per location basis, a per enterprise basis, a per business group basis, or a combination thereof.

17. The network device of claim 9, wherein the hydrocarbon consumption savings are calculated in a form selected from one or more of kWh, BTU, metric tons of CO2 that is used for pollution credit trading.

18. The network device of claim 9, wherein the derived hydrocarbon consumption savings are summed across one or more of:
- a plurality of devices at the primary location,
- a plurality of users at the primary location,
- a plurality of locations in an enterprise, and
- a specific group of users in the enterprise.

19. A non-transitory computer-readable storage medium storing embedded instructions that are executed by one or more mechanisms implemented within a network device for validating hydrocarbon consumption through a digital network having a plurality of remote access points to perform a plurality of operations comprising:
- validating a remote location of a remote access point using location information provided by a location-aware device of a user that is authenticated by the remote access point, wherein validating the remote location includes determining an occupancy state of the user at the remote location and a primary location, based on one or more of (i) whether a wireless connection or a wired port is actively used by the user at the primary location, (ii) whether an access controlled entry is granted to the user or a vehicle associated with the user at the primary location, and (iii) using presence information or wireless triangulation to ensure that the user is at the primary location;

calculating a distance from the validated remote location to a primary location associated with the user;

deriving hydrocarbon consumption savings from the user working at the remote location rather than the primary location based on the distance, the derived hydrocarbon consumption savings are based on at least one of (i) avoiding travel between the remote location and the primary location, and (ii) office energy savings from having the user working away from the primary location associated with the user; and generating a report that includes at least the derived hydrocarbon consumption savings and utilizing the report for pollution credit sharing between an owner or user of the primary location or an owner or user of the remote location, wherein the pollution credit sharing includes trading or splitting credits with the owner or user of the primary location.

* * * * *